US012789526B2

(12) United States Patent
Miura

(10) Patent No.: US 12,789,526 B2
(45) Date of Patent: Nov. 10, 2026

(54) PRINTING ELEMENT BOARD

(71) Applicant: CANON KABUSHIKI KAISHA, Tokyo (JP)

(72) Inventor: Yosuke Miura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 202 days.

(21) Appl. No.: 18/734,574

(22) Filed: Jun. 5, 2024

(65) Prior Publication Data

US 2024/0416651 A1 Dec. 19, 2024

(30) Foreign Application Priority Data

Jun. 14, 2023 (JP) ................................ 2023-097566

(51) Int. Cl.
*B41J 2/14* (2006.01)
*B41J 2/175* (2006.01)

(52) U.S. Cl.
CPC ......... *B41J 2/14072* (2013.01); *B41J 2/1433* (2013.01); *B41J 2/175* (2013.01); *B41J 2002/14491* (2013.01)

(58) Field of Classification Search
CPC ...... B41J 2/14072; B41J 2/1433; B41J 2/175; B41J 2002/14491; B41J 2/04528; B41J 2202/20; B41J 2/04541; B41J 2/0458; B41J 2/14129; B41J 2/14088; B41J 29/393
See application file for complete search history.

(56) References Cited

U.S. PATENT DOCUMENTS

| | | | | |
|---|---|---|---|---|
| 2018/0333954 | A1* | 11/2018 | Yamato ................ | B41J 2/04543 |
| 2019/0001680 | A1* | 1/2019 | Miura .................. | H05K 1/0212 |
| 2022/0153023 | A1* | 5/2022 | Hirohara .............. | B41J 2/14129 |
| 2024/0416651 | A1 | 12/2024 | Miura | |

FOREIGN PATENT DOCUMENTS

| | | |
|---|---|---|
| JP | 2017-213874 A | 12/2017 |

* cited by examiner

*Primary Examiner* — Bradley W Thies
(74) *Attorney, Agent, or Firm* — VENABLE LLP

(57) ABSTRACT

One embodiment of the present invention is a printing element board including a plurality of printing elements configured to eject a liquid, the plurality of printing elements being arrayed in a first direction to form a printing element array; a heat generating element configured to heat the liquid; a driver configured to drive the heat generating element; a data processing circuit configured to control the driver; and a plurality of PADs configured such that a signal to be sent to the data processing circuit is inputted to the plurality of PADs from outside, the plurality of PADs being arrayed in the first direction to form a PAD array, wherein the data processing circuit is provided in at least two or more systems between the printing element array and the PAD array in a second direction orthogonal to the first direction.

20 Claims, 18 Drawing Sheets

Inf12

| | |
|---|---|
| 1st BIT | PRESENCE OR ABSENCE OF SUB-HEATER SELECTION DATA (Inf21) |
| 2nd BIT | PRESENCE OR ABSENCE OF ADDITIONAL DATA 2 (Inf22) |
| 3rd BIT | PRESENCE OR ABSENCE OF ADDITIONAL DATA 3 (Inf23) |
| 4th BIT | PRESENCE OR ABSENCE OF ADDITIONAL DATA 4 (Inf24) |
| 5th BIT | PRESENCE OR ABSENCE OF ADDITIONAL DATA 5 (Inf25) |
| 6th BIT | PRESENCE OR ABSENCE OF ADDITIONAL DATA 6 (Inf26) |
| 7th BIT | PRESENCE OR ABSENCE OF ADDITIONAL DATA 7 (Inf27) |
| 8th BIT | PRESENCE OR ABSENCE OF ADDITIONAL DATA 8 (Inf28) |

FIG.13

| CORRESPONDING Dt | ITEM | BYTE NUMBER | BIT 7 | BIT 6 | BIT 5 | BIT 4 | BIT 3 | BIT 2 | BIT 1 | BIT 0 |
|---|---|---|---|---|---|---|---|---|---|---|
| Dt1 | SUB-HEATER SELECTION DATA 1 | 1st BYTE | SH_A1 | SH_B1 | SH_C1 | SH_D1 | SH_A2 | SH_B2 | SH_C2 | SH_D2 |
| | | 2nd BYTE | SH_A3 | SH_B3 | INDEFINITE | INDEFINITE | INDEFINITE | INDEFINITE | INDEFINITE | INDEFINITE |
| Dt2 | SUB-HEATER SELECTION DATA 2 | 1st BYTE | SH_C3 | SH_D3 | SH_A4 | SH_B4 | SH_C4 | SH_D4 | SH_A5 | SH_B5 |
| | | 2nd BYTE | SH_C5 | SH_D5 | INDEFINITE | INDEFINITE | INDEFINITE | INDEFINITE | INDEFINITE | INDEFINITE |

FIG.15

PRINTING ELEMENT BOARD

BACKGROUND

Field

The present disclosure relates to a technique of a printing element board included in a printing apparatus which prints by ejecting a liquid.

Description of the Related Art

In a printing element board used in a printing apparatus which prints by ejecting a liquid such as ink, a temperature control to control the temperature of the printing element board is conducted with recent demands for an increase in image qualities and an increase in functions. In addition, to meet the demands, there is a tendency of an increase in the number of nozzles of a printing element board and an increase in the frequency of driving the nozzles.

In a printing element board, the amount of droplets to be ejected and the ejection speed vary depending on the temperature. For this reason, in a case where a temperature distribution of the board temperature is generated, the temperature distribution leads to image unevenness, so that the image quality decreases.

Japanese Patent Laid-Open No. 2017-213874 discloses, as a method for correcting a temperature distribution of a board, a method including: mounting a driver of a sub-heater in specific areas in a printing element board; and selecting and heating one or more of the areas to suppress a temperature unevenness in the board.

SUMMARY

However, the configuration of Japanese Patent Laid-Open No. 2017-213874 is a configuration which includes only one system of a data processing circuit in which data for selecting and driving sub-heaters through an input of the data from outside, and this configuration cannot sufficiently meet the aforementioned demands for an increase in image qualities and an increase in functions.

In the configuration which includes one system of a data processing circuit, a wiring connecting the data processing circuit to switches configured to drive all the sub-heaters becomes long, making the layout on the board complicated. In addition, regarding an input of data to this configuration, basically this configuration can employ only one communication passage. Then, in a case where a large number of sub-heaters are driven, the number of pieces of data to be inputted increases, and thus an increase in the frequency cannot be achieved.

In view of this, an object of the present disclosure is to provide a configuration of a printing element board that is capable of reducing a wire resistance, improving a layout, and achieving an increase in the frequency as compared with the conventional configuration.

One embodiment of the present invention is a printing element board comprising: a plurality of printing elements configured to eject a liquid, the plurality of printing elements being arrayed in a first direction to form a printing element array; a heat generating element configured to heat the liquid; a driver configured to drive the heat generating element; a data processing circuit configured to control the driver; and a plurality of PADs configured such that a signal to be sent to the data processing circuit is inputted to the plurality of PADs from outside, the plurality of PADs being arrayed in the first direction to form a PAD array, wherein the data processing circuit is provided in at least two or more systems between the printing element array and the PAD array in a second direction orthogonal to the first direction.

Further features of the present invention will become apparent from the following description of exemplary embodiments with reference to the attached drawings.

BRIEF DESCRIPTION OF THE DRAWINGS

FIG. 13 is a diagram showing a content of an additional information specifying section (Inf12);

FIG. 15 is a diagram showing a configuration of sub-heater selection data;

DESCRIPTION OF THE EMBODIMENTS

First Embodiment

Hereinafter, a liquid ejection head and a printing element board included in the liquid ejection head according to the present embodiment will be described with reference to the drawings. Note that the following embodiments are not intended to limit the invention according to Claims more than necessarily. In addition, although a plurality of features are described in the following embodiments, all the plurality of features are not necessarily essential to the solution of problems of the present disclosure, and the plurality of features may be combined in any way. Moreover, in the attached drawings, the same or similar configurations are denoted by the same reference signs, and repetitive descriptions are omitted in some cases.

Figure 1A:
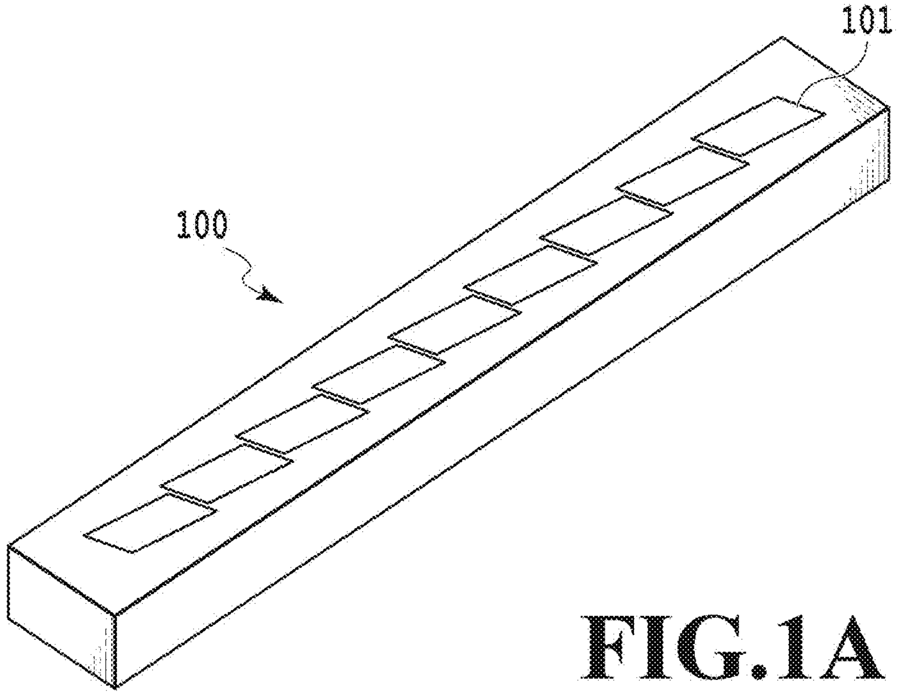
FIG. 1A and FIG. 1B are perspective views of a liquid ejection head.
Figure 1B:
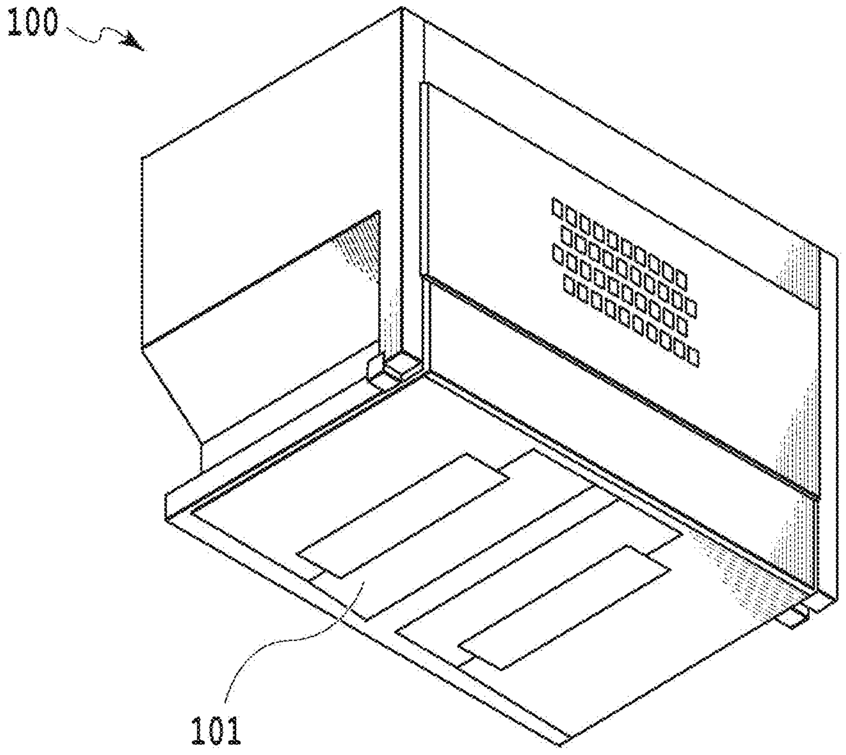

FIG. 1A and FIG. 1B are simplified perspective views showing an appearance of a liquid ejection head in the present embodiment. FIG. 1A shows a liquid ejection head 100 in which a plurality of printing element boards 101 are arranged side by side. This liquid ejection head is a form generally called a "line head".

FIG. 1B shows a liquid ejection head 100 in which two printing element boards 101 are arranged side by side as another form different from that in FIG. 1A. This liquid ejection head is a form generally called a "serial head". Note that although the case where the liquid ejection head has two printing element boards is shown in the present example, a liquid ejection head of serial head form generally includes one or two printing element boards.

FIG. 2A to FIG. 2D are plan views showing the shapes of the printing element board 101 in the present embodiment. The printing element board 101 of FIG. 2A has a shape of a parallelogram in which a plurality of PADs 102 which are input and output portions of electricity are provided along one of two longer sides of the parallelogram, so that a PAD array is formed in parallel with the one side. The PADs 102 are electrodes for inputting signals to be sent to data processing circuits (see FIG. 3), which will be described later, to the printing element board 101 from outside.

Figure 2A:
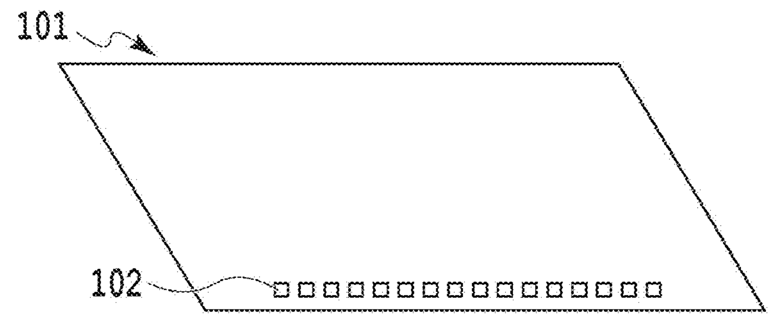
FIG. 2A to FIG. 2D are plan views of a printing element board.
Figure 2B:
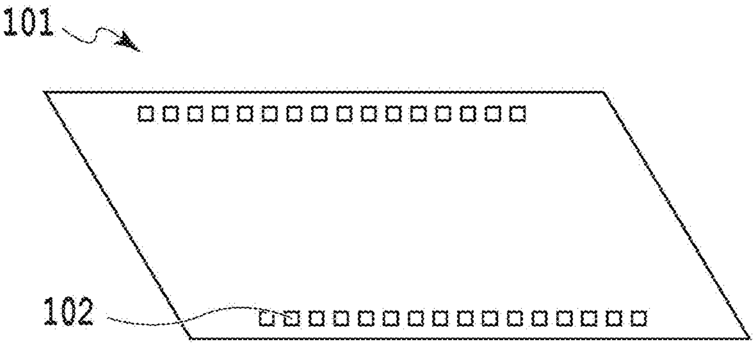

The printing element board 101 of FIG. 2B has a shape of a parallelogram in which a plurality of PADs 102 are provided along each of two longer sides of the parallelogram, so that two PAD arrays are formed.

Figure 2C:
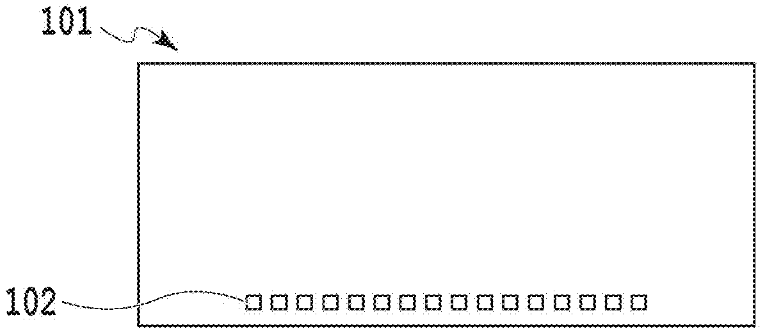

The printing element board 101 of FIG. 2C has a shape of a rectangle in which a plurality of PADs 102 are provided along one of two longer sides of the rectangle, so that a PAD array is formed in parallel with the one side.

Figure 2D:
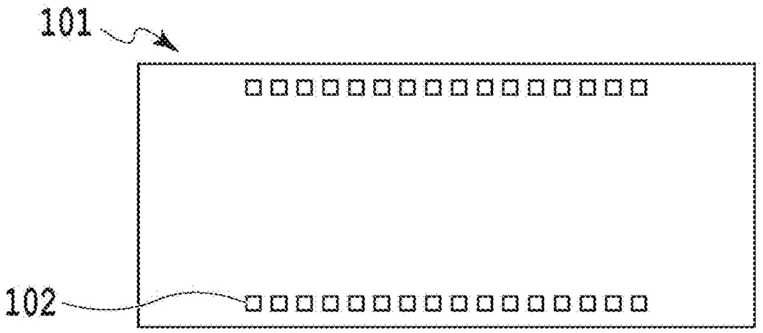

The printing element board 101 of FIG. 2D has a shape of a rectangle in which a plurality of PADs 102 are provided along each of two longer sides of the rectangle, so that two PAD arrays are formed.

Note that the shape of the printing element board is any of the shapes of FIG. 2A to FIG. 2D in general but is not limited to these. For example, the shape may be trapezoidal, and the PADs 102 may also be arranged in various manners. The shape of the printing element board only has to be a quadrilateral composed of long sides and short sides.

Figure 3:
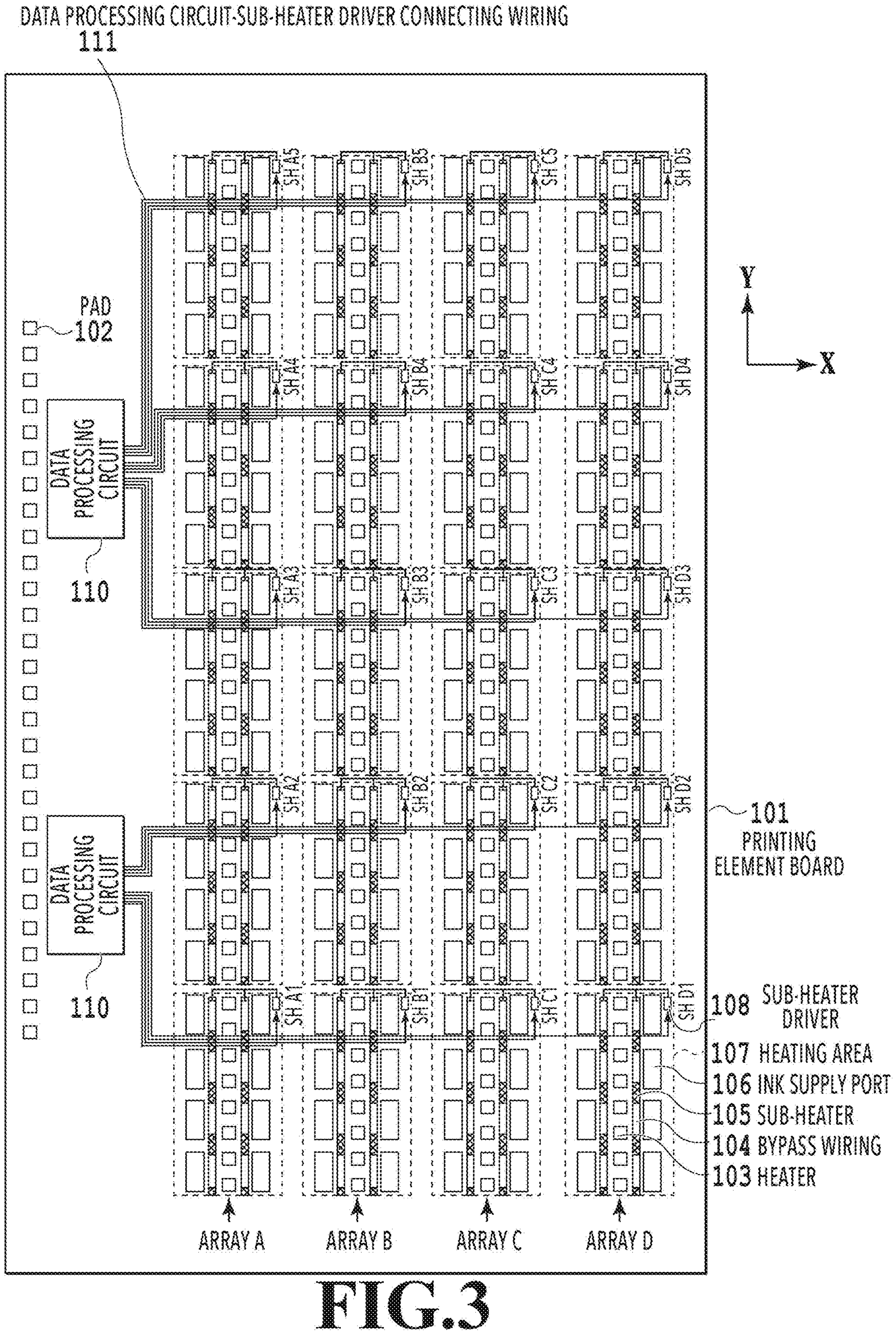
FIG. 3 is a diagram showing a layout of the printing element board.

FIG. 3 is a diagram showing a layout of the printing element board in the present embodiment. In a board end portion of the printing element board 101, the plurality of PADs 102 are provided side by side in a Y direction. These PADs 102 include signal terminals through which to receive data for selecting nozzles to eject ink, power supply terminals, and the like.

The printing element board 101 includes a plurality of heaters 103. The heaters 103 are printing elements for ejecting a liquid such as ink. In the present example, the plurality of heaters 103 are arrayed in the Y direction, and array A to array D are provided as heater arrays (also referred to as printing element arrays).

The printing element board 101 is provided with ink supply ports 106 for supplying the ink to be ejected from the nozzles along the heater arrays, and the ink having flowed in from the ink supply ports 106 is supplied to the upper portions of the heaters 103.

Ejection ports 205 (see FIG. 8B and FIG. 9B) are disposed immediately above the heaters 103, and current is caused to flow into the heaters 103 at desired timings to heat or foam the ink and to eject ink droplets from the ejection ports 205. Note that the present embodiment is described with the heaters as an example of ink ejection elements, but a configuration of ejecting ink by pressurizing the ink using piezoelectric elements or the like may also be employed.

The printing element board is provided with a plurality of sub-heaters 105. The sub-heaters 105 are elements for controlling the temperatures of the printing element board 101 and the ink and are specifically heat generating elements for temperature adjustment for heating or maintaining the temperature. Sub-heater drivers 108 are connected to the sub-heaters 105 and conduct control of ON/OFF of the current to be caused to flow into the sub-heater 105 (control from ON to OFF or from OFF to ON). Note that the detailed configuration around the sub-heaters 105 of the present embodiment will be described later by using FIG. 7A to FIG. 7F.

A wiring between the data processing circuit 110 and the sub-heater driver 108 is routed as data processing circuit-sub-heater driver connecting wiring 111. "Sub-heater control signals" which are signals for driving the plurality of sub-heaters 105, respectively, are stored in the data processing circuit 110. The sub-heater control signals of the present example are specifically SH_A1 to SH_A5 for array A, SH_B1 to SH_B5 for array B, SH_C1 to SH_C5 for array C, and SH_D1 to SH_D5 for array D. The sub-heater control signals SH_A1 to SH_D5 are transmitted to the corresponding sub-heater drivers each at a desired timing. As shown in the drawing, the wirings between the data processing circuit 110 and of the plurality of sub-heaters drivers 108 are all individual wirings.

In the present embodiment, two data processing circuits 110 are provided between the array of the PADs 102 and the printing element array (specifically, array A) to cause the printing element board 101 to have two wiring systems. This configuration makes an individual wiring layout region to each sub-heater about half in size basically, and improves the wiring layout. In addition, since the wiring lengths can be shortened, the risk of malfunction due to noises is also reduced. In addition, although in the present example, the case where the printing element board 101 has the data processing circuits 110 of two systems is shown, the number of systems of the data processing circuits 110 is not limited to two, and it is only necessary that at least two or more systems of the data processing circuits are provided.

Figure 4:
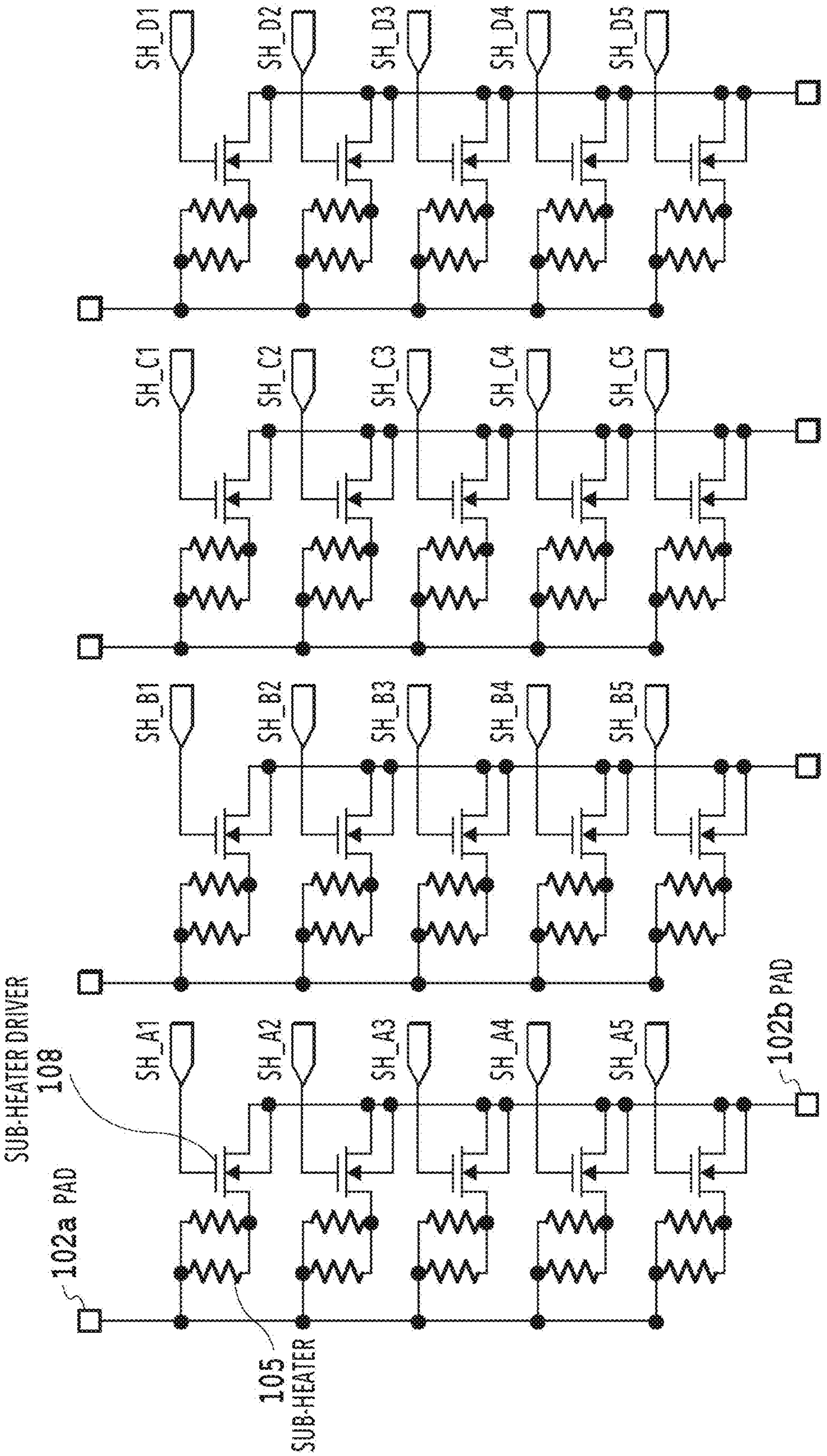
FIG. 4 is a diagram showing a configuration of a sub-heater driving circuit.

FIG. 4 is a diagram of a circuit for driving the sub-heaters 105 and shows a circuit configuration corresponding to FIG. 3. In FIG. 4, PADs 102*a* are +power supply PADs, and PADs 102*b* are GND PADS.

Figure 6:
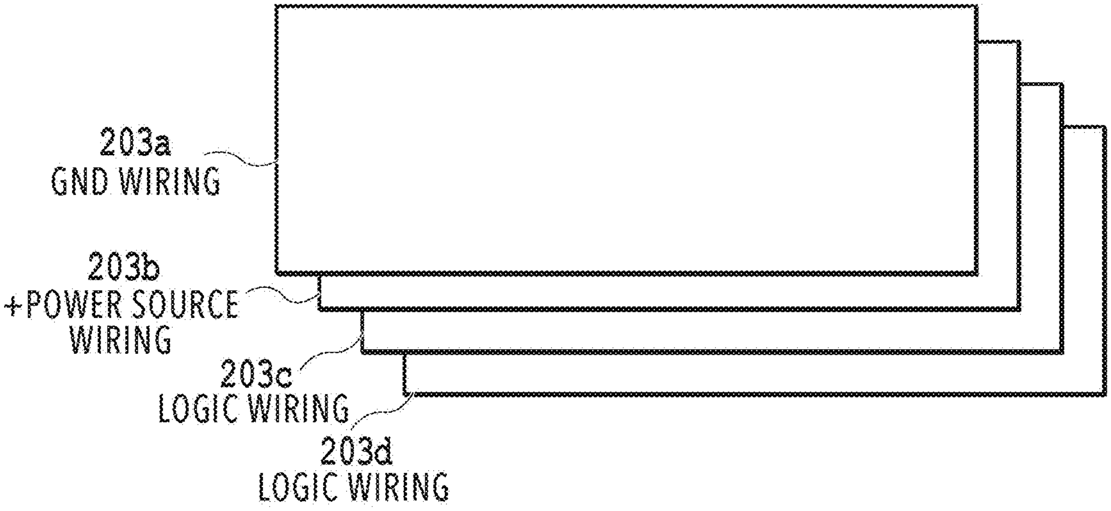
FIG. 6 is a diagram showing a four-layer structure of a wiring layer in the printing element board.

As shown in FIG. 6, a wiring layer of the printing element board of the present embodiment has a four-layer structure composed of four layers of aluminum (hereinafter, Al). Note that in the present specification, regarding the four layers, the lowermost layer is referred to as a first layer, the intermediate layers are referred to as a second layer and a third layer from below, and the uppermost layer is referred to as a fourth layer.

The fourth layer 203*a*, which is the uppermost layer, is provided with a GND wiring for the heaters 103 and the sub-heaters 105. The third layer 203*b*, which is the intermediate layer closer to the uppermost layer, is provided with a +power source wiring for the heaters 103 and the sub-heaters 105.

The second layer 203*c*, which is the intermediate layer closer to the lowermost layer, and the first layer 203*d*, which is the lowermost layer, are provided with logic wirings. This logic wiring is used for the aforementioned data processing circuit-sub-heater driver connecting wiring 111 and the like. The printing element board of the present embodiment has a configuration in which power is supplied from the + power supply PAD to the sub-heaters via the +power source wiring of the third layer 203*b* and flows to the PADs 102*b*, which are GND PADs, via the GND wiring of the fourth layer 203*a*. Note that these power supply PADs may also be used as power supply PADs for the heaters 103 used for ejection of ink droplets.

The sub-heater drivers 108, which are controlled by the sub-heater control signals SH_A1 to SH_D5, drive the sub-heaters. This heats any of heating areas 107 which are provided at 20 positions within the printing element board 101. Note that in the case where the temperature inside the printing element board is desired to be controlled with higher precision than in the present example (FIG. 3), 20 or more heating areas may be provided. As shown in FIG. 3, in a case where a certain heater array (any one of array A to array D) is focused on, the plurality of ink supply ports 106 are disposed along an extension direction of the heater array to form a supply port array, and two supply port arrays are formed in such a manner as to sandwich the heater array. In addition, the sub-heater drivers 108 are disposed on the outer side than these two arrays of ink supply ports in a left-right direction in the drawing with respect to the ink supply port 106. Note that the sub-heater control signals SH_A1 to SH_D5 may be directly supplied from the PADs 102 or may be generated by converting data signals in the printing element board 101.

In a case where any one heating area is focused on, two supply port arrays are provided for each one of the printing element arrays, and the sub-heater drivers 108 are disposed in regions on the opposite side from the printing element array with respect to the supply port array which is relatively close among the two supply port arrays in the X direction.

Figure 5:
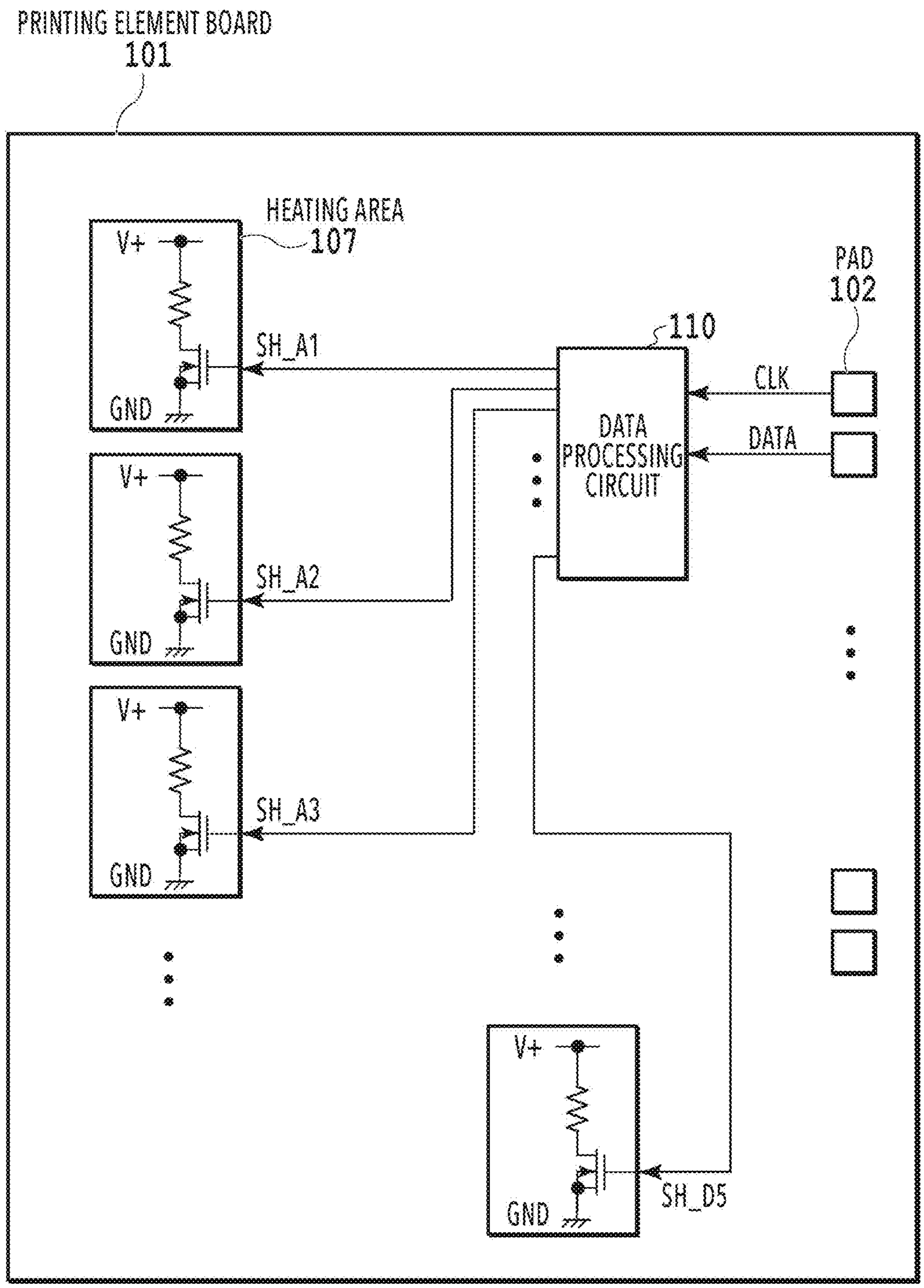
FIG. 5 is a block diagram in a case where sub-heater control signals are generated in the printing element board.

Here, FIG. 5 shows a block diagram in a case where sub-heater control signals are generated in the printing element board. In the case of the method of FIG. 5, if control signal data is sent to the data processing circuit 110 simultaneously with image data via the PAD 102, sub-heater control signals are generated based on the control signal data in the data processing circuit 110. In this way, the method of FIG. 5 makes it possible to control the sub-heaters without need to particularly increase the number of PADs 102 for supplying sub-heater control signals.

In FIG. 3, the plurality of sub-heaters 105 are arranged side by side in the direction of the longer sides of the chip (the Y direction in the drawing), and the sub-heaters 105 are arranged between the ink supply ports 106 and the heaters 103 in the X direction which is orthogonal to the Y direction. Since this arrangement allows the ink near the heaters 103 to be heated, the ink to be ejected can be heated more efficiently than the case where the sub-heaters 105 are not provided. The layouts of the sub-heaters of the plurality of the heating areas 107 in the printing element board are substantially the same, all of which are basically the same. The numbers of the heaters 103 contained respectively in the plurality of heating areas 107 are equal. Hence, basically, the amounts of heat generated by the sub-heaters in the respective areas are made equal, making it possible to conduct temperature control to make the temperature distribution in the printing element board 101 uniform. However, in the case of changing the amount of heat generated by the sub-heaters for each area considering that a temperature difference is likely to occur at end portions of the printing element board or the like, the layout of the sub-heater may be adjusted to adjust the temperature for each area.

Figure 7A:
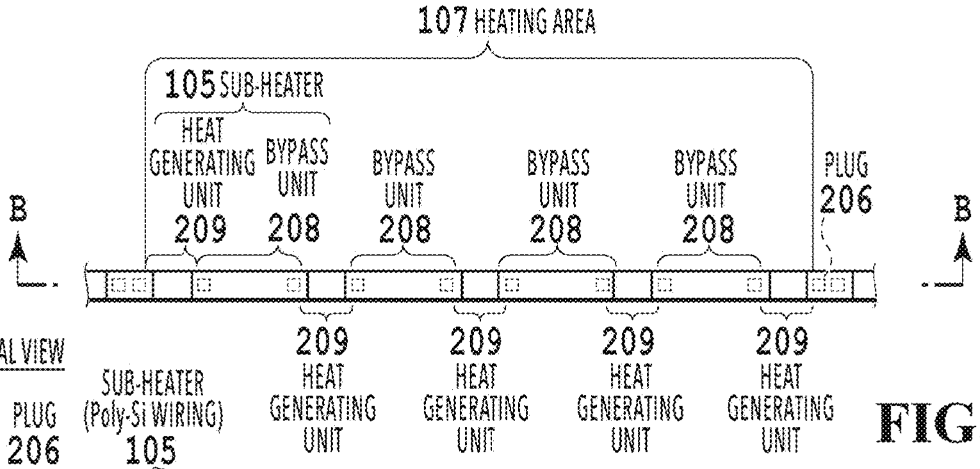
FIG. 7A to FIG. 7F are diagrams showing detailed configurations of sub-heaters.

FIG. 7A to FIG. 7F are diagrams showing configurations of the sub-heaters 105 in the present embodiment. Specifically, FIG. 7A is a top view of the sub-heaters, and FIG. 7B to FIG. 7F are sectional views of the sub-heaters. Note that although polysilicon (described as Poly-Si) is used as the sub-heater material here, the sub-heater material is not limited to polysilicon.

Figure 7B:
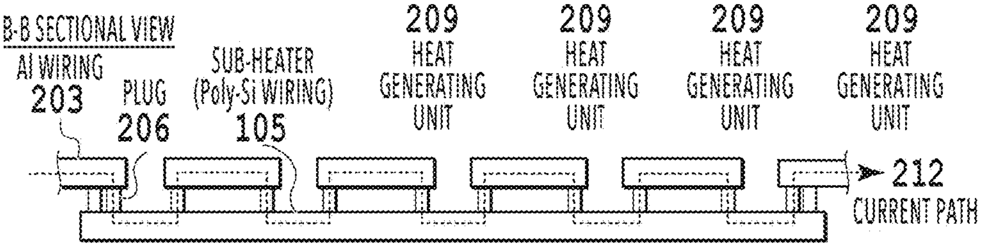

In FIG. 7A, the sub-heaters 105 of the heating area 107 are configured with heat generating units 209 at five positions and bypass units 208 at four positions. This bypass unit 208 is configured with an Al wiring 203 and a plug 206 as shown in FIG. 7B. The resistance value of the bypass unit 208 is sufficiently small such as 1/100 to 1/1000 times that of the sub-heater 105 and is estimated as 0 ohm in the present example. Note that the bypass unit 208 can be formed of at least one of aluminum (Al), copper (Cu), gold (Au), nickel (Ni), tungsten (W), titanium (Ti), or compounds thereof.

The plug 206 can be formed of, for example, tungsten (W). By connecting the Al wiring 203, which has a relatively low resistance, to the Poly-Si wiring of the sub-heaters 105, current flowing through the heating area 107 is caused to flow alternately through the heat generating units 209 and the bypass units 208 as indicated by an arrow 212 of FIG. 7B. Since most of current flows through a portion which is located between the adjacent Al wirings 203 in the sub-heater 105, this portion functions as the heat generating unit 209 to generate heat. In this way, the Al wirings 203 are connected to be both ends for any of the heat generating units 209 and are connected in parallel with the portions other than the heat generating units in the sub-heaters 105. The configuration described above allows the current to flow through the Al wiring 203 via a plug 206 in the course of the path of the current flowing through this sub-heater 105 in the case where the sub-heater 105 is energized in the heating area 107.

Since the sub-heaters 105 in the present embodiment have a configuration in which the heat generating units 209 to generate heat are arranged to be dispersed with respect to the heating area 107, it could be said that the heating area 107 cannot be uniformly heated. However, since the heat generating unit 209 and the heat generating unit 209 adjacent to each other are connected by the bypass unit 208, which is formed of a metal and has a low thermal resistance, this causes the heat generated by the heat generating units 209 to diffuse via the bypass units 208, so that the heating area 107 is uniformly heated.

Note that in the case where the heating area 107 is desired to be heated more uniformly, the area may be increased by shortening the length of each bypass unit 208 while maintaining the ratio between the length and the width of each heat generating unit 209. However, in this case, the effect that reduces the area of the circuit or the board (shrink effect) decreases.

In contrast, in the case where the length and width of each heat generating unit 209 are reduced and the length of the bypass unit 208 is increased, a high shrink effect can be obtained. However, in this case, since the density of current flowing through the wiring increases, there is a possibility of disconnection due to electromigration or the like. The "electromigration" refers to a phenomenon in which metal atoms are moved by causing current to flow through a metal wiring inside an integrated circuit. In an aluminum wiring, aluminum atoms move in a direction of flow of electrons, so that voids are generated on the cathode side to cause open fault, while on the anode side, a hillock or a whisker grows, eventually leading to a short fault.

Figure 7C:
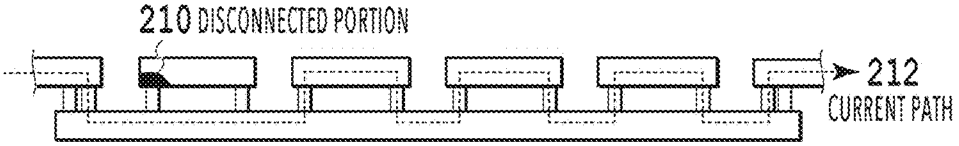

FIG. 7C shows an example in which disconnection occurred due to electromigration. Since current is concentrated in the plug 206, electromigration relatively easily occurs in a contact portion of the plug 206 with the Al wiring 203. In general, the circuit is designed to have a current range that does not cause such faults, and further a measure such as interposing a barrier metal between the Al wiring 203 and the plug 206 is taken. In the present embodiment, even if disconnection occurs in the Al wiring 203, current bypasses to the Poly-Si wiring of the sub-heater 105, so that the sub-heating function is not lost, because the sub-heater 105 is routed across the range of the heating area 107. Such a wiring method makes it possible to obtain a high reliability of the sub-heating drive. However, in the case where disconnection occurs, the resistance increases, so that the amount of heat generated decreases. Therefore, in the case where disconnection occurred, it is desirable to suppress the drive of the sub-heaters in the area where disconnection occurred as much as possible.

As indicated by a current path of the arrow 212, since the resistance of the sub-heater 105 is high, the current tends to flow through the Al wiring 203 having a lower resistance. Hence, as shown in FIG. 7B, even in the case where two arrays of plugs 206 are provided at the Al wiring 203 at the end portion, the current flows into a plug on the front side as viewed from the heat generating unit 209. However, regarding the ports where the power supply is taken at both ends of the sub-heater, in the case where disconnection has occurred, the sub-heating function is lost. For this reason, two or more arrays of plugs 206 are provided to allow the current to flow via the plugs on the back side even in the case where disconnection has occurred on the front side. Such a configuration makes it possible to prevent complete disconnection at both ends of the sub-heaters. Note that the same effect can be obtained in the Al wiring 203, two or more arrays of Al wirings 203 may be disposed in place of the plugs 206 (or together with the plugs 206).

Figure 7D:
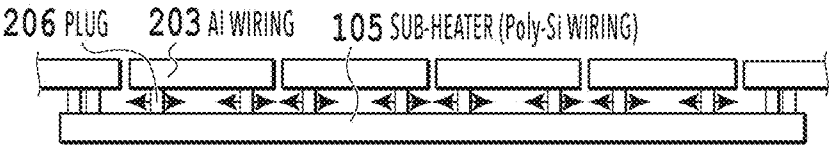

In FIG. 7D, the length of the Al wiring is longer than in FIG. 7B. As indicated by the arrow in the drawing, it becomes possible to adjust the amount of heat generated only by changing the positions of the plugs. For example, in the case where the plugs 206 are disposed to be closer to the end portions of the Al wirings 203 (that is, in the case where the plugs 206 are disposed on an outer side), the length of the heat generating units is shortened, so that the resistance decreases, and the amount of heat to be generated can be adjusted to increase. On the other hand, in the case where the plugs are disposed away from the end portions of the Al wirings 203 (that is, in the case where the plugs are disposed on an inner side), the resistance value increases, so that the amount of heat to be generated can be adjusted to decrease. In the case where the configuration of FIG. 7D is employed, since the design can be changed by using only one mask, it becomes possible to reduce the cost in the case of changing the amount of heat to be generated in the sub-heaters.

Figure 7E:
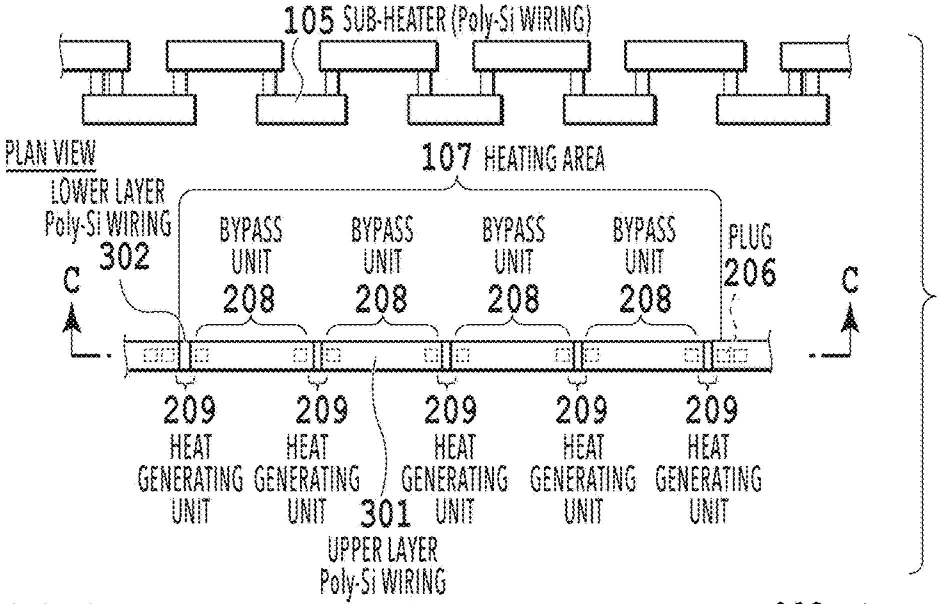

FIG. 7E shows a configuration in which the Poly-Si wiring of the sub-heaters is purposefully cut in the bypass units. In this configuration, although the aforementioned advantage of the bypass cannot be obtained, the degree of freedom in layout increases.

Figure 7F:
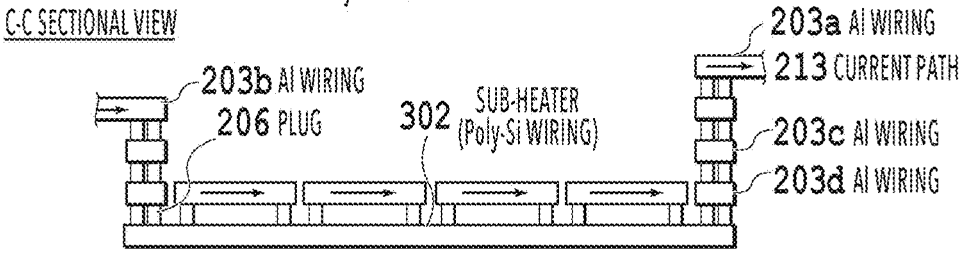

FIG. 7F shows a section of the sub-heaters in the aforementioned Al four-layer structure. In the case where the sub-heaters 105 are driven, current flows in via the Al wiring provided in the third layer 203*b* and flows through the heating area 107, and eventually the current flows out via the Al wiring provided in the fourth layer 203*a*, which is the uppermost layer.

Figure 8A:
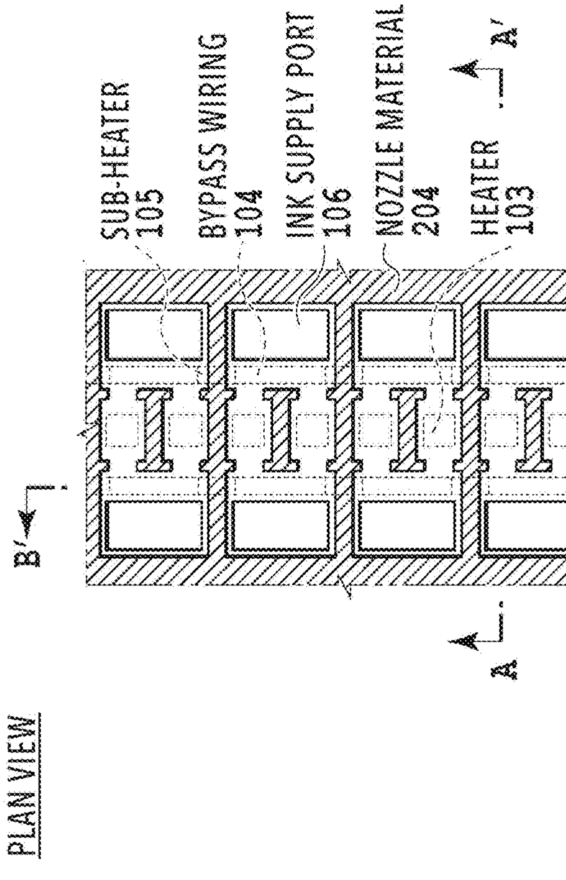
FIG. 8A to FIG. 8C are diagrams showing a detailed configuration near heaters (in a case where a sub-heater material is polysilicon)

FIG. 8A is an enlarged plan view of the vicinity of the heaters 103 in the printing element board 101 shown in FIG. 3. Note that in FIG. 8A, the sub-heater drivers 108 are omitted for simplification.

As shown in FIG. 8A, an ink flow passage corresponding to the heaters 103 and the ink supply ports 106 is partitioned by a nozzle material, and one ink supply port 106 is provided on each of the left and right sides in the drawing for two heaters 103. This configuration allows ink refill after ejection of the ink to be conducted from the ink supply ports 106 on both sides, making it possible to increase the ejection frequency and improve the printing throughput. In addition, in the present embodiment, since the width of the sub-heaters can be reduced without lowering the amount of heat generated as mentioned above, disposing the sub-heaters 105 between the heaters 103 and the ink supply ports 106 does not affect the ejection frequency.

Figure 8B:
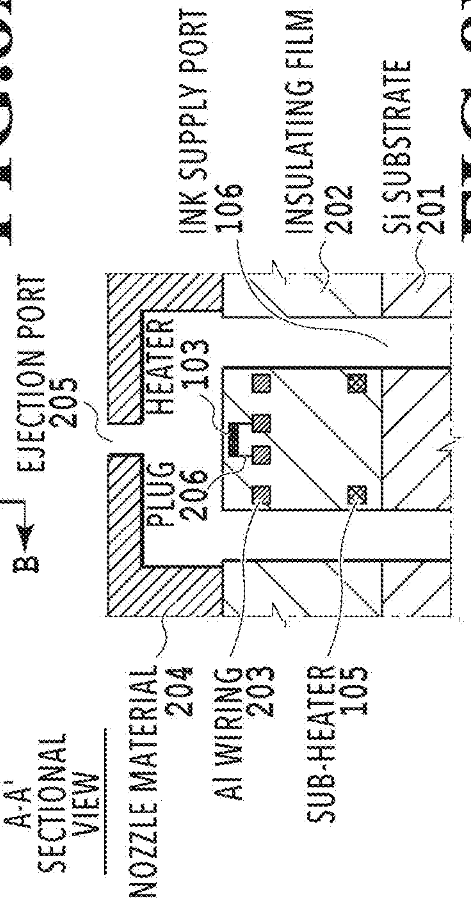
Figure 8C:
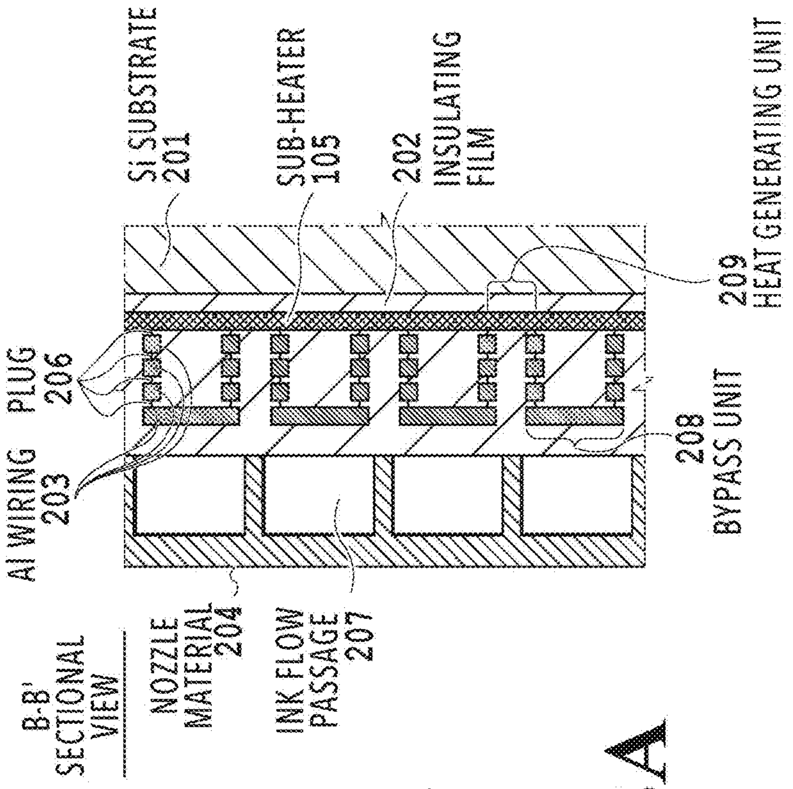

FIG. 8B is a sectional view taken along a section line A-A' of FIG. 8A (a view obtained by cutting the heater 103 in a direction of the ink flow passage). FIG. 8C is a sectional view taken along a section line B-B' of FIG. 8A (a view obtained by cutting the sub-heater 105 in a longitudinal direction).

In the example shown in FIGS. 8A to 8C, the sub-heater 105 is configured with the bypass unit 208 and the heat generating units 209. In addition, as shown in FIG. 8B, the sub-heater 105 is provided in the lowermost layer with a polysilicon wiring. Moreover, as shown in FIG. 8B and FIG. 8C, the Al wiring 203 has four layers, on which the heater layer is stacked. Then, these wirings are connected by the plugs 206 and covered with the insulating layer 202. The nozzle material is stacked on the upper layer, and the ink flow passage 207 and the ejection port 205 are formed. Note that although in the present example, the Al wirings 203 bypass through the fourth layer, the Al wirings 203 may bypass through a layer other than the fourth layer.

As shown in FIG. 8B, the sub-heaters 105 are separated away from the heaters 103 with which the ink is ejected, but the position to conduct the sub-heating is ideally the vicinity of the heaters 103, which is closer to the ink to be ejected. In view of this, the present embodiment has a configuration in which the bypass units 208 (FIG. 8C) are provided near the heaters, and bypassing is made through the Al wirings in the upper layer, which is further closer to the heater 103, so that heat generated in the heat generating units of the sub-heaters 105 is passed to portions closer to the heaters. This configuration makes it possible to conduct sub-heating at portions closer to the ink to be ejected, to achieve a reduction in viscosity of the ink by heating the ink, making it possible to increase the speed of the ink refill, and making it possible to further improve the printing throughput. In addition, this configuration makes it possible to eject ink with high viscosity, thus leading to an increase in image qualities and an increase in the degree of freedom in ink selection.

Figures 9A, 9B, 9C:
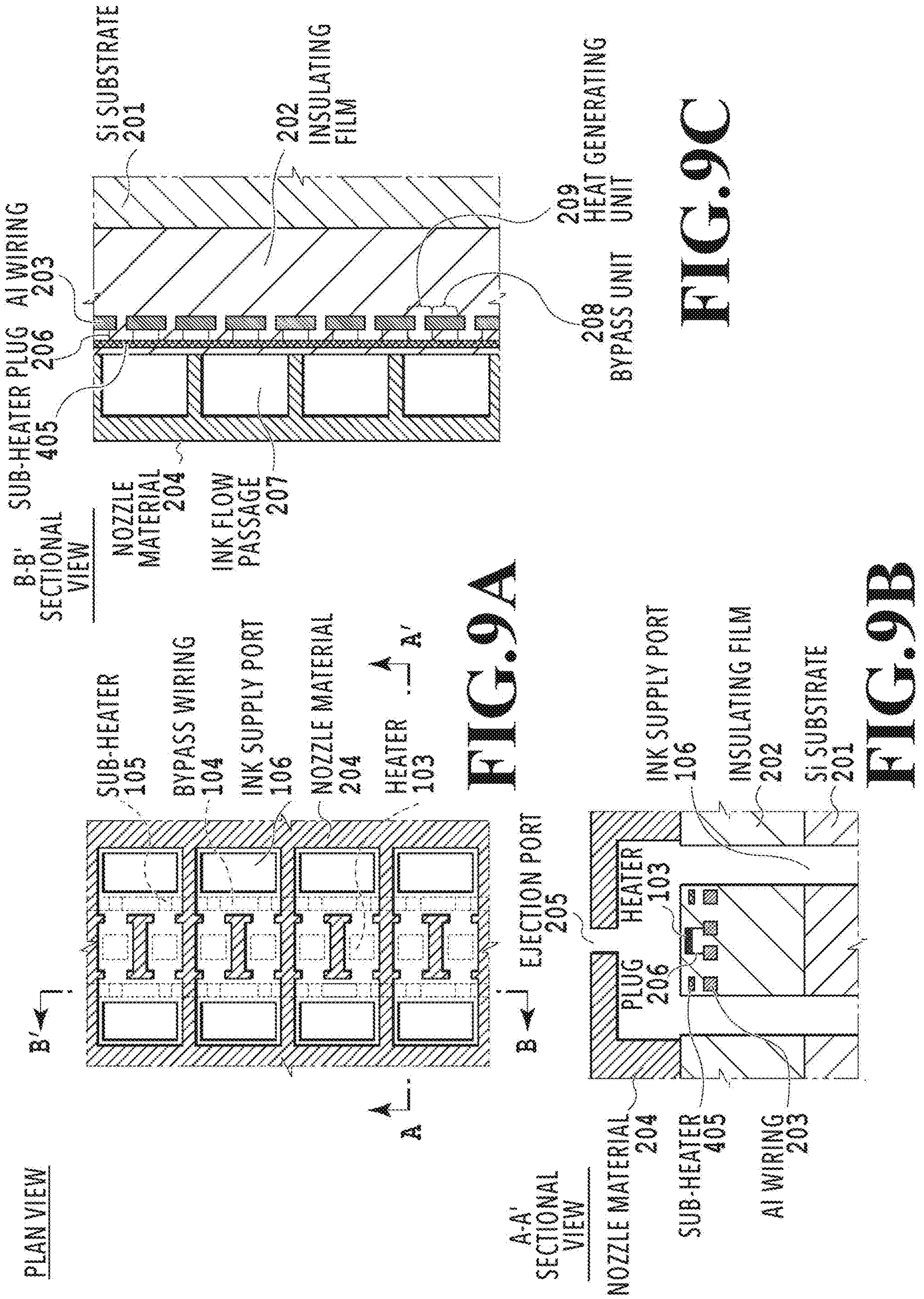
FIG. 9A to FIG. 9C are diagram showing a detailed configuration near heaters (in a case where the sub-heater material is a heater material)

FIG. 9A is an enlarged plan view of the vicinity of the heaters 103 like FIG. 8A, but shows a case where the same films as the heaters 103 but not polysilicon are used as the sub-heater material. FIG. 9B is a sectional view taken along a section line A-A' of FIG. 9A (a view obtained by cutting the heater 103 in the direction of the ink flow passage). FIG. 9C is a sectional view taken along a section line B-B' of FIG. 9A (a view obtained by cutting the sub-heater 105 in the longitudinal direction).

In general, the resistance value of a heater material of the heaters 103 for ejecting ink is higher than that of polysilicon. Therefore, as shown in FIG. 9C, it is necessary to adjust the resistance value of the entire sub-heaters 405 by increasing the number of bypass units 208 as compared with the case of FIG. 8C which uses polysilicon having a lower resistance value as the sub-heater material. However, unlike the configuration of FIG. 8A to FIG. 8C, the configuration of FIG. 9A to FIG. 9C is a configuration in which the sub-heaters 405 are close to the heaters 103, and the heat generating units 209 of the sub-heaters 405 are disposed near the heaters 103. Hence, it is possible to heat the vicinity of the ink to be ejected more than the configuration of FIG. 8A to FIG. 8C and to obtain a larger temperature increasing effect than FIG. 8A to FIG. 8C.

Hereinafter, a data configuration for driving the sub-heaters will be described by using FIG. 10 to FIG. 13.

Figure 10:
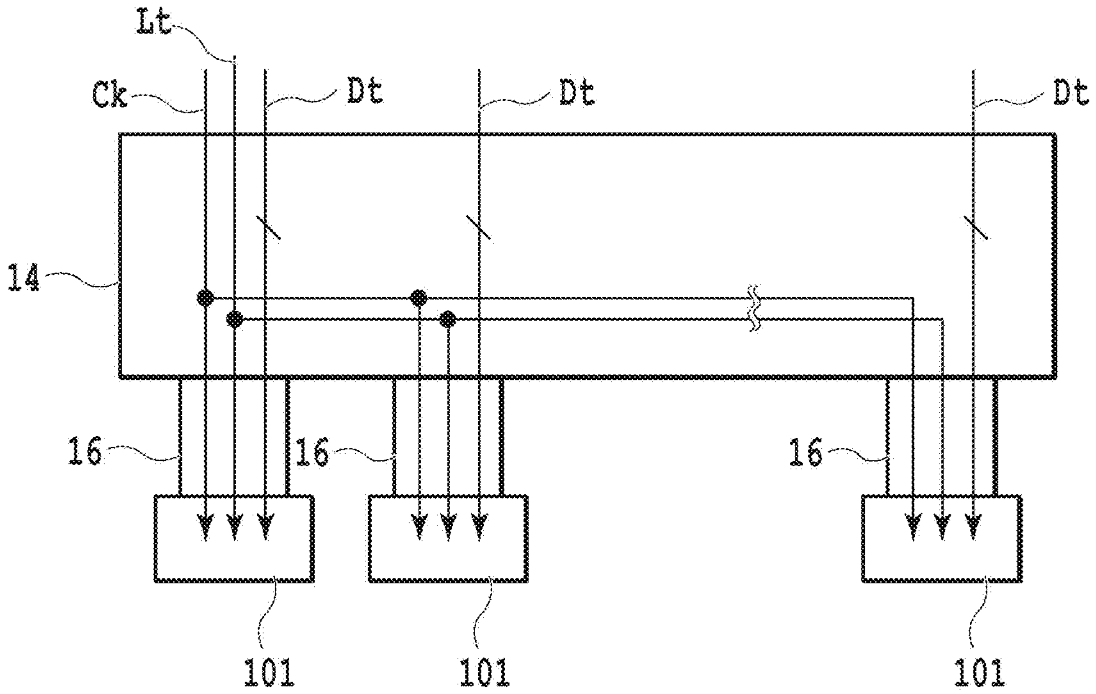
FIG. 10 is a block diagram showing a configuration of a liquid ejection head.

FIG. 10 is a block diagram of a liquid ejection head including a head board 14 and a plurality of printing element boards 101. To each of the plurality of printing element boards 101, a clock signal Ck and a latch signal Lt transmitted from a control board are inputted through a flexible board 16 in addition to print data Dt. The clock signal Ck enables two or more elements to be synchronized by means of at least one of the rising edge (transition from the low level to the high level) and the falling edge (transition from the high level to the low level) of this signal waveform. The latch signal Lt enables each signal included in the print data Dt to be latched in a latch circuit, which is not shown, by means of the rising edge or the falling edge of this signal waveform. Note that although FIG. 10 shows a line head configuration, it goes without saying that the liquid ejection head of the present embodiment may be of a serial head configuration.

Figure 11:
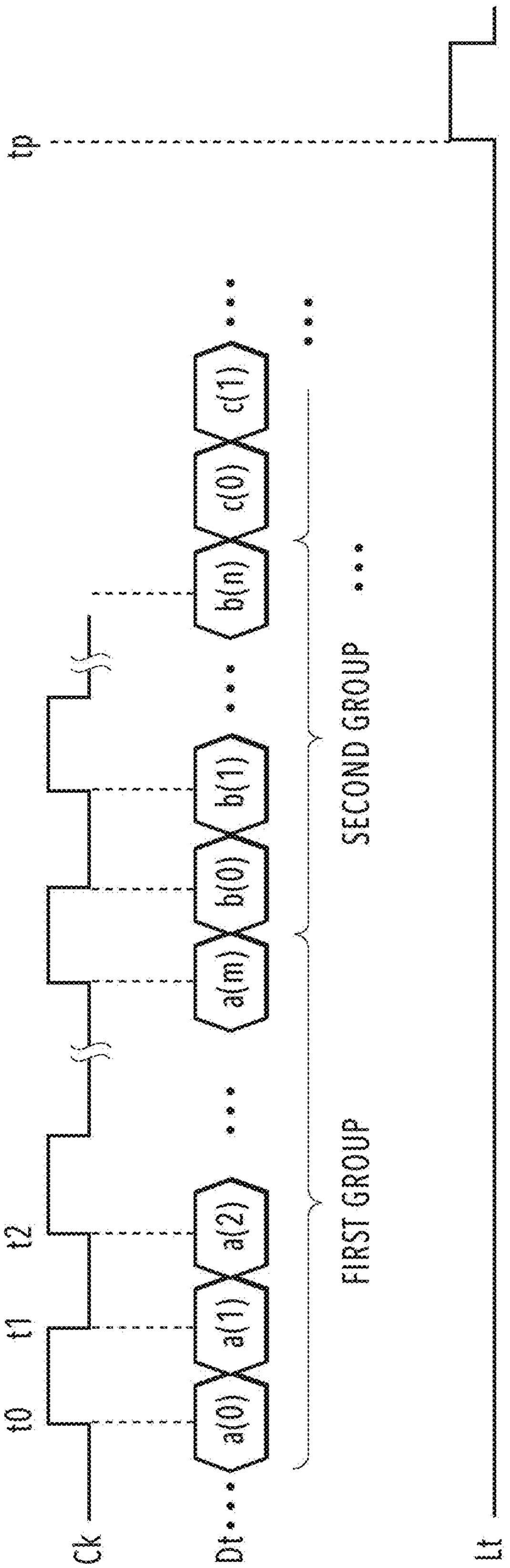
FIG. 11 is a timing chart of data and signals to be inputted to the printing element board.

FIG. 11 shows the print data Dt for one transmission as well as the clock signal Ck and the latch signal Lt inputted together with the print data Dt to the printing element board 101. The print data Dt is transmitted in a predetermined unit by a serial transmission method, and data for one transmission is referred to as a packet or the like. Although the detail of the print data Dt will be described later, the print data Dt contains a plurality of information sections inf11, inf12, and the like (simply referred to as "information section inf" in a case where these sections do not have to be particularly distinguished) and each information section inf is configured to contain a plurality of signals. For example, it is assumed that the information section inf11 is m-bit data containing signals a(0), a(1), a(2) . . . , a(m) and the information section inf12 is n-bit data containing signals b(0), b(1), b(2) . . . , b(n), where m and n are each an integer of 1 or more. Note that bit data is composed of a plurality of signals, and a value of each signal can be expressed as a bit value.

In the example of FIG. 11, the above signal a(0) and the like are inputted in order in accordance with the rising edge/the falling edge of the clock signal Ck at time t0, t1, t2, and the like, and thereafter, the signal a(0) and the like thus transmitted are latched at time tp at which the latch signal Lt forms the rising edge. As described above, the print data Dt for one transmission is defined from the falling edge of a certain latch signal Lt to the rising edge of the next latch signal Lt.

Figure 12:
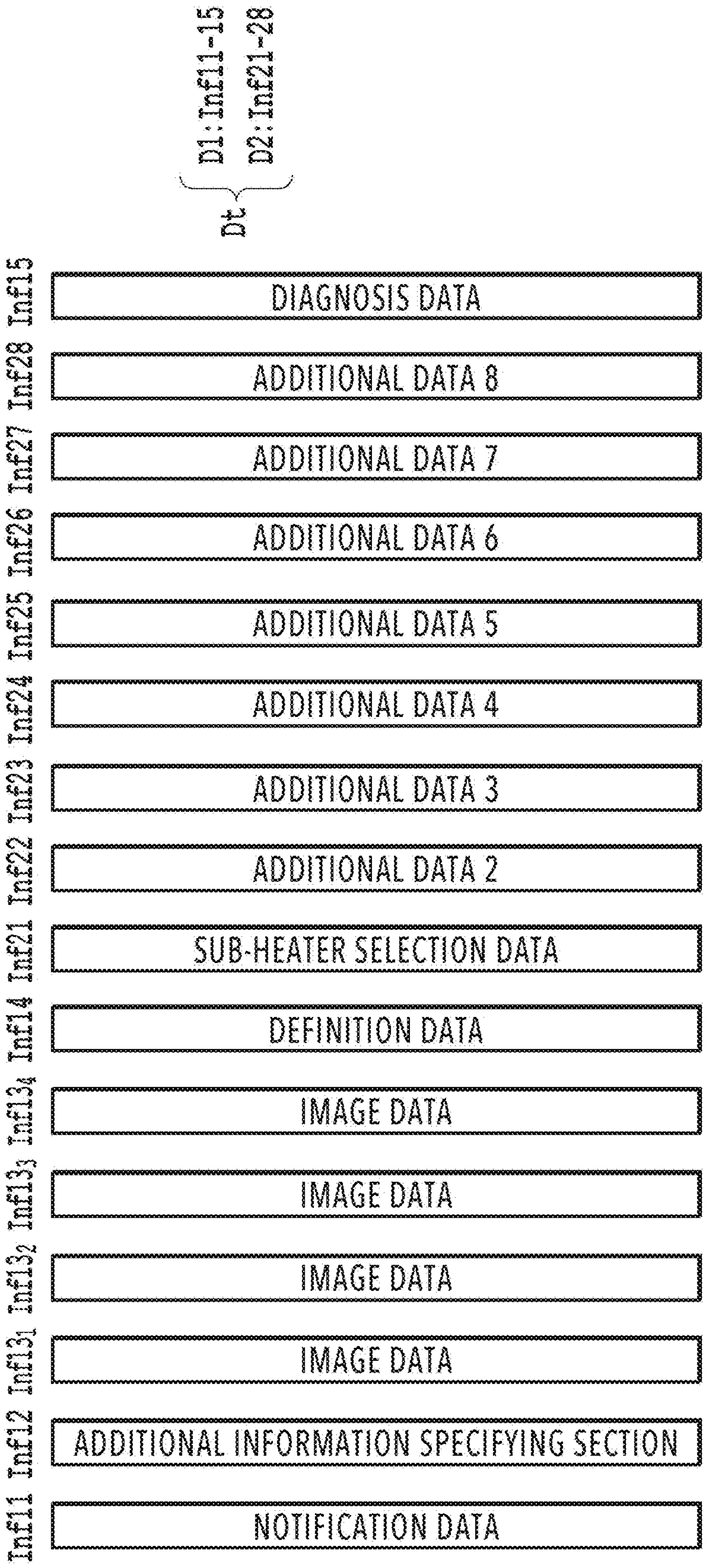
FIG. 12 is a diagram showing a configuration of print data (packet) Dt for one transmission.

FIG. 12 shows an example of a configuration of the print data Dt for one transmission. The print data Dt contains a first data section D1, and may optionally contain a second data section D2. The data section D1 is configured to contain a plurality of information sections inf11 to inf15, and the data length (data size) of the data section D1 is assumed to be fixed. On the other hand, the data section D2 is configured to be capable of containing a plurality of additional information sections inf21 to inf28, and the data length of the data section D2 is assumed to be variable.

First, the data section D1 will be described.

The information section inf11 forms one aspect (start condition) of the header of the print data Dt and configures notification data indicating the start of communications.

The information section inf12 indicates the presence or absence of each of the plurality of additional information sections inf21 to inf28 which can be contained in the data section D2. As mentioned above, the data length of the data section D2 is variable depending on the presence or absence of each of the plurality of additional information sections inf21 to inf28.

The information section inf13 configures data for selecting which heater is driven. One row of the heaters is allocated to each one block of the image data.

The information section inf14 configures definition data for defining a pulse waveform of a signal for driving the heaters and a driving timing.

The information section inf15 configures diagnosis data for diagnosing whether or not the transmission of the print data Dt has been properly executed.

Next, the data section D2 will be described.

In the present embodiment, only the additional information section inf21 (sub-heater selection data) is specifically defined as an additional information section. To inf22 and later, for example, temperature sensor selection data, test waveform selection data, presence-of-ejection check data, and the like may be applied.

In this way, the data section D1 contains information that is necessary to actually execute printing and information that directly relates to the printing operation itself. On the other hand, the data section D2 contains information that is necessary in a preparation stage before execution of printing and information that indirectly relates to the printing operation.

FIG. 13 shows a content of the information section inf12, which is an additional information specifying section. In the present embodiment, the information section inf12 is 8-bit data. The 1st bit indicates the presence or absence of the additional information section inf21. The 2nd bit indicates the presence or absence of the additional information section inf22. Similarly, the 3rd to 8th bits indicate the presence or absence of the corresponding additional information sections inf, respectively. In the present embodiment, each bit is assumed to take two values, "0" or "1". "0" indicates that the corresponding additional information section inf is present or that the operation is not effective, and "1" indicates that the corresponding additional information section infis absent or that the operation is effective. For example, in the case where the 1st bit is "0", the data section D2 contains the additional information section inf21. In addition, in the case where the 1st bit is "1", the data section D2 does not contain the additional information section inf21.

As mentioned above, an increase in image qualities and an increase in functions of printing apparatuses have been recently demanded, and thus, the number of heaters and the number of sub-heaters of the printing element board 101 are increasing, and the number of pieces of data to be transferred is also increasing. Besides, an increase in the frequency of driving heaters and an increase in data transfer speed have been demanded, so that the frequency (between LT-LT) of data transfer is being shortened. For this reason, in the present embodiment, it is assumed that print data is divided into two or more pieces, and the print data thus divided is transferred by using two communication passages. This is one of the characteristics of the present embodiment.

Figure 14:
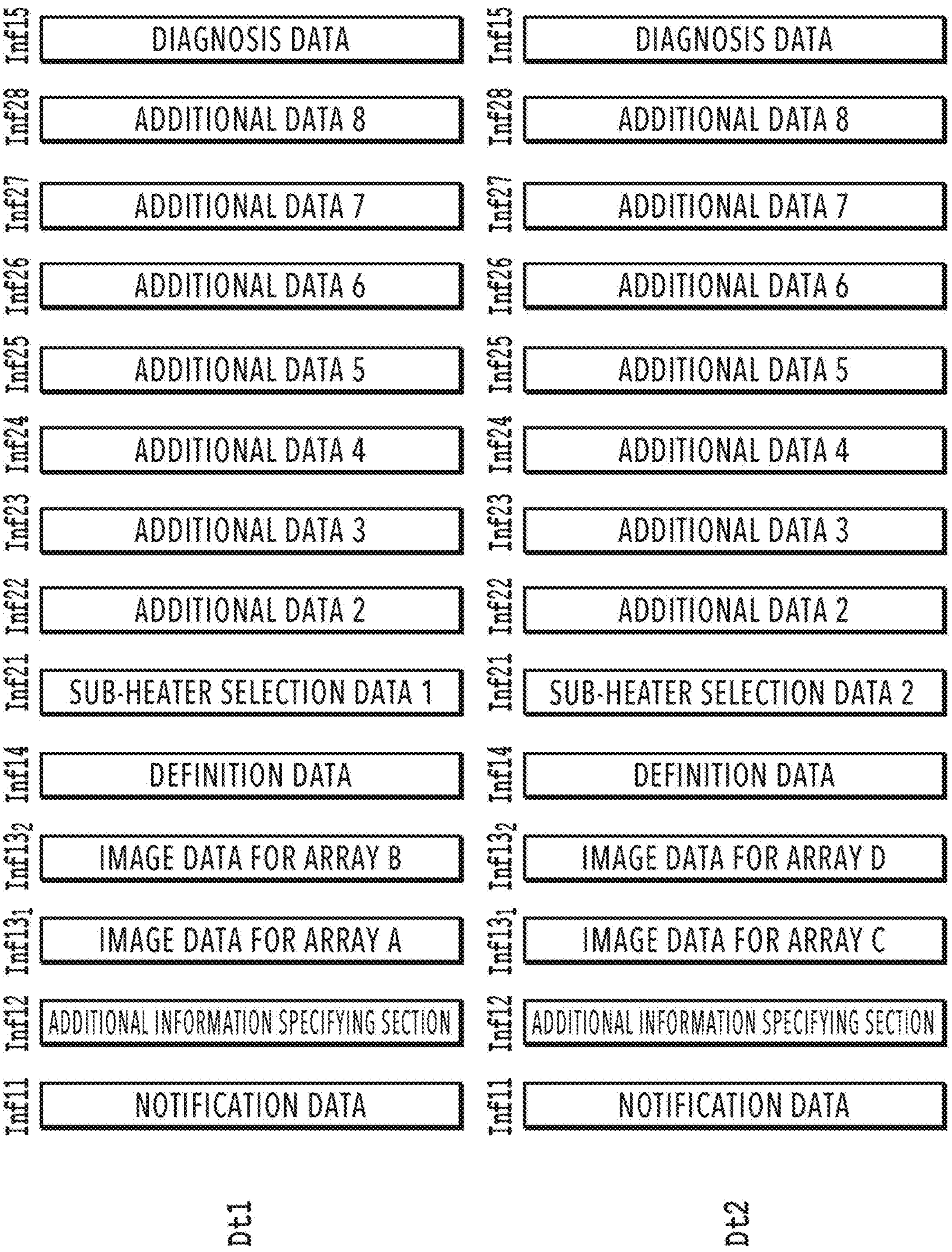
FIG. 14 is a diagram showing a configuration of print data in the present embodiment.

FIG. 14 shows a configuration of a case where print data to be transferred is divided into two pieces and the print data thus divided is transmitted through two communication passages as a configuration of print data in the present embodiment.

As shown in FIG. 14, image data is divided for each heater array (array A to array D). Among the image data thus divided, the image data for array A configures an information section inf131 of first print data Dt1, and the image data for array B configures an information section inf132 of the first print data Dt1. In addition, the image data for array C configures an information section inf131 of a second print data Dt2, and the image data for array D configures an information section inf132 of the second print data Dt2.

In addition, sub-heater selection data is also divided into halves. One of the divided halves configures an additional information section inf21 of the first print data Dt1, and the other configures an additional information section inf21 of the second print data Dt2. Such a data configuration makes it possible to reduce the number of pieces of data contained in the print data Dt and to thus achieve an increase in the frequency of driving heaters.

FIG. 15 shows a detail of sub-heater selection data which configures the additional information section inf21 of FIG. 14. The sub-heater selection data shown in FIG. 15 corresponds to the printing element board 101 shown in FIG. 3. That is, since the printing element board 101 of FIG. 3 includes 20 heating areas 107 and the sub-heaters of one system are provided for each heating area 107, the printing element board 101 includes the sub-heaters of 20 systems in total. Therefore, as shown in FIG. 15, sub-heater control signals for the sub-heaters of 10 systems are transferred as sub-heater selection data 1 of Dt1. In addition, sub-heater control signals for the sub-heaters of the remaining 10 systems are transferred as sub-heater selection data 2 of Dt2. Note that since the sub-heater selection data is sent in byte unit, unused data frames are generated (stated as “INDEFINITE” in the drawing). To these, which is allocated, “1” or “0”, does not affect the operation.

Basically, a design in which the number of communication passages for sending divided Dt, the number of communication passages for sending divided sub-heater selection data, and the number of systems of data processing circuits for selecting sub-heaters are set to be equal is considered as having favorable efficiency in data transfer and efficiency in circuit·wiring layout. Therefore, the printing element board 101 of the present example is configured to include two communication passages for sending Dt and sub-heater selection data as described later (see FIG. 16). However, the present embodiment is not limited to this configuration. The number of communication passages may also be two or more.

Figure 16:
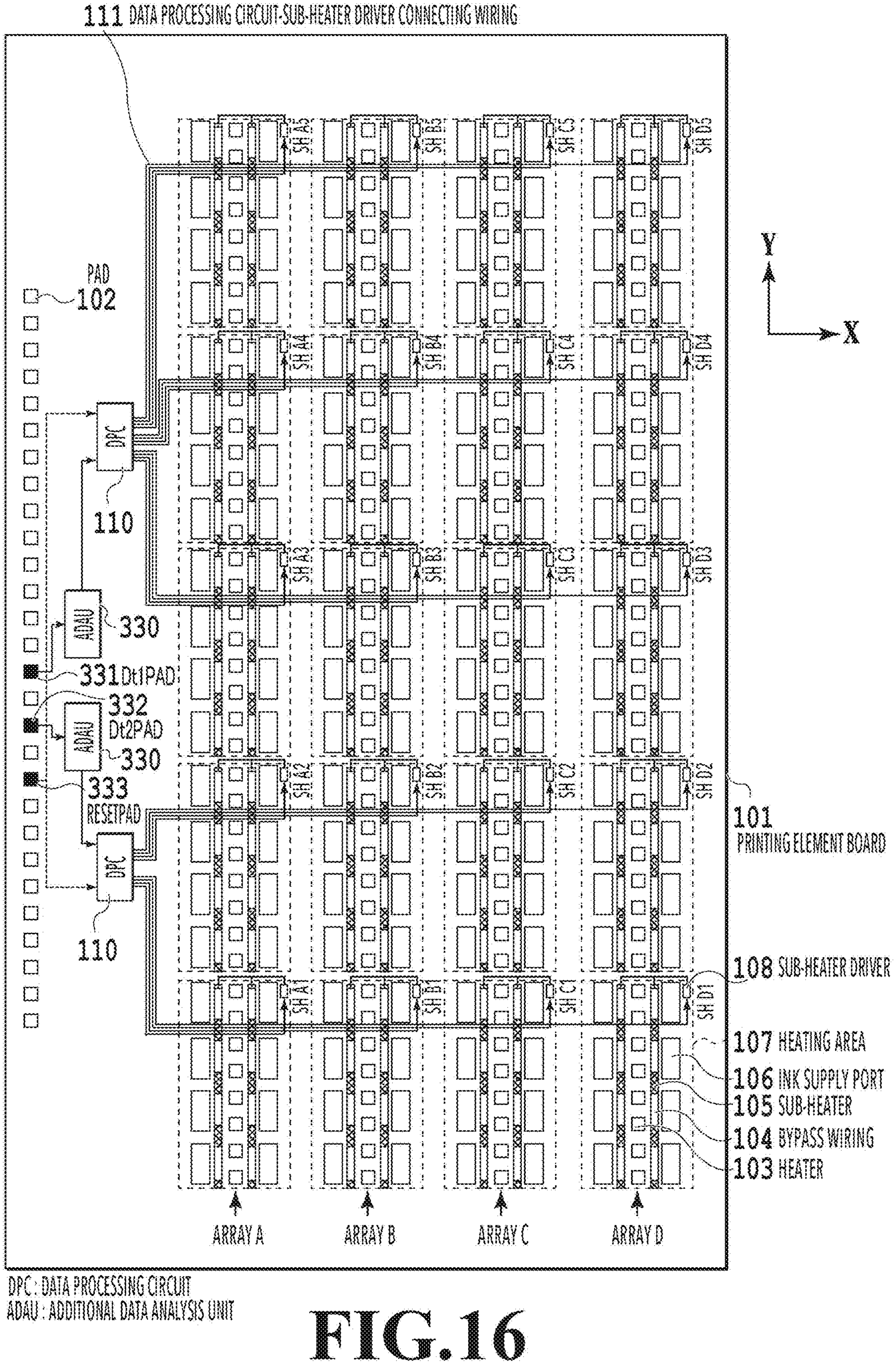
FIG. 16 is a diagram for explaining a data input to the printing element board.

FIG. 16 is a diagram showing an input aspect of Dt to the printing element board 101 in a case of selectively driving the sub-heaters.

As shown in FIG. 16, first print data Dt1 is inputted from a Dt1PAD 331, and second print data Dt2 is inputted from a Dt2PAD 332. In a case where the first print data Dt1 and the second print data Dt2 are inputted, a plurality of additional information sections inf (additional data) are inputted to an additional data analysis unit 330. Note that the first print data Dt1 and the second print data Dt2 are collectively referred to as Dt if there is no need to particularly distinguish these print data.

After print data Dt is inputted, the additional data analysis unit 330 refers to the 1st bit of Inf12 of Dt to determine the presence or absence of sub-heater selection data. Then, in a case where the additional data analysis unit 330 has determined that the sub-heater selection data is present, data (sub-heater selection data) of the additional information section Inf21 is stored in a shift register of the data processing circuit 110. Thereafter, at a timing when an LT signal is inputted, the sub-heater control signal is transferred to the sub-heater driver 108 of the sub-heater 105.

In addition, a reset signal to reset a value held in the shift register (change the value to “0”) can be inputted from a RESETPAD 333. The reset signal is used when the printing apparatus is started to be driven or in a case where an error has occurred.

Figure 17A:
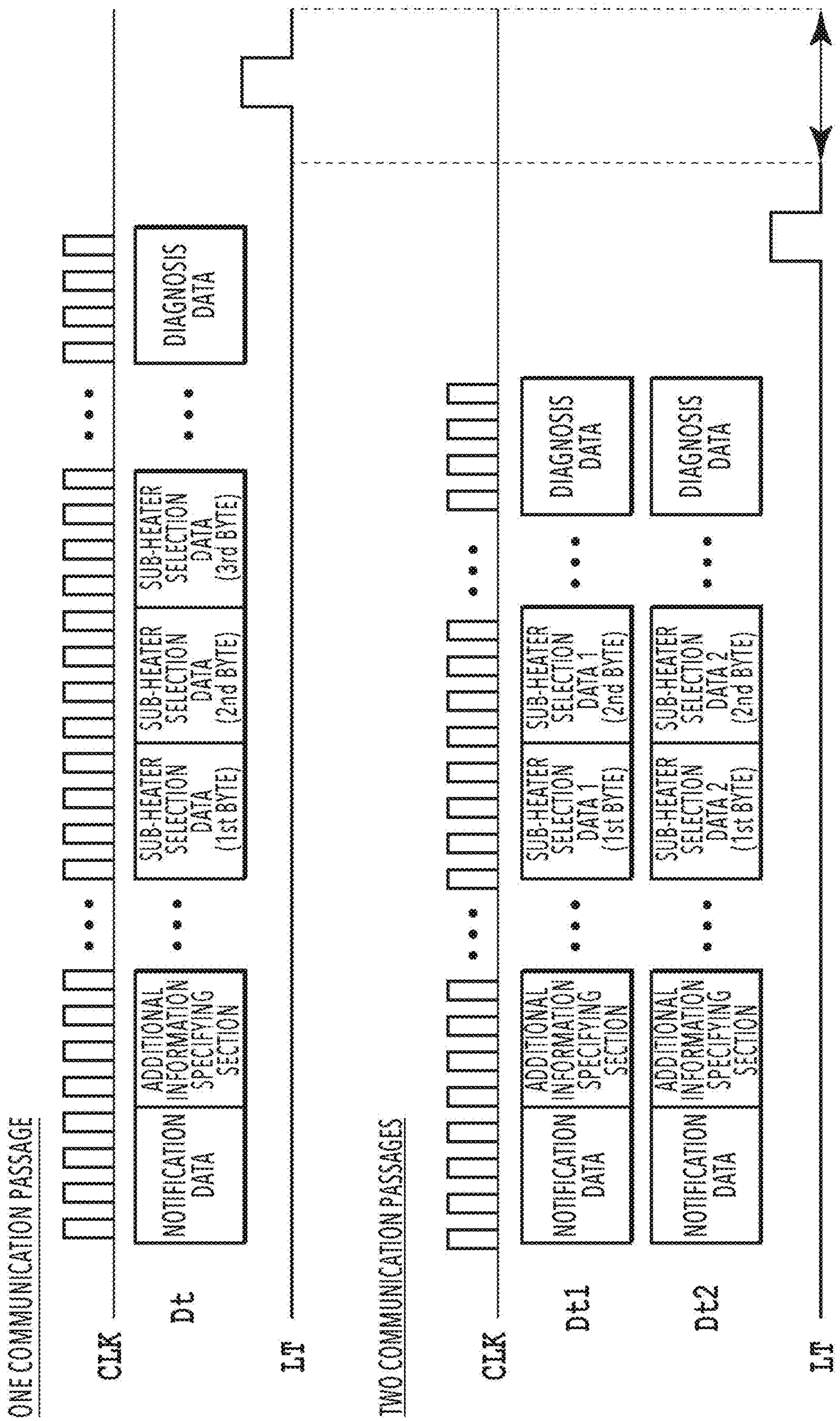
FIG. 17A and FIG. 17B are diagrams for explaining an effect of using two communication passages.

FIG. 17A is a diagram for explaining an effect in a case where two communication passages are disposed in the printing element board 101. FIG. 17A is timing charts of signals and print data to be transferred, and the lower stage (stated as TWO COMMUNICATION PASSAGES) corresponds to the configuration of the present embodiment (see FIG. 16). Note that for reference, a timing chart corresponding to a conventional configuration is also shown in the upper stage (stated as ONE COMMUNICATION PASSAGE) of FIG. 17A. As shown in FIG. 17A, the additional information specifying section of Dt1 (or Dt2) is sent at a constant cycle (specifically several kHz to several tens of kHz). By using this additional information specifying section, the additional data analysis unit 330 determines whether a control signal for the sub-heater is transferred to the sub-heater driver at a constant cycle.

As mentioned above, since the printing element board 101 shown in FIG. 16 includes the sub-heaters of 20 systems and it is necessary to send the control signal to each sub-heater, the print data to be transmitted has 20 bits. In addition, the sub-heater selection data is transmitted in byte unit. Therefore, in a case of one communication passage, it is necessary to separate sub-heater selection data in three pieces and send the sub-heater selection data (sub-heater selection data (the 1st byte), sub-heater selection data (the 2nd byte), and sub-heater selection data (the 3rd byte)).

In contrast, in a case where two communication passages are employed as in the present embodiment, it is only necessary to separate sub-heater selection data in two pieces and send the sub-heater selection data through the respective communication passages (sub-heater selection data (the 1st byte) and sub-heater selection data (the 2nd byte)). Therefore, since the period of time between latch signals can be shortened by one byte, which contributes to an increase in the frequency.

Figure 17B:
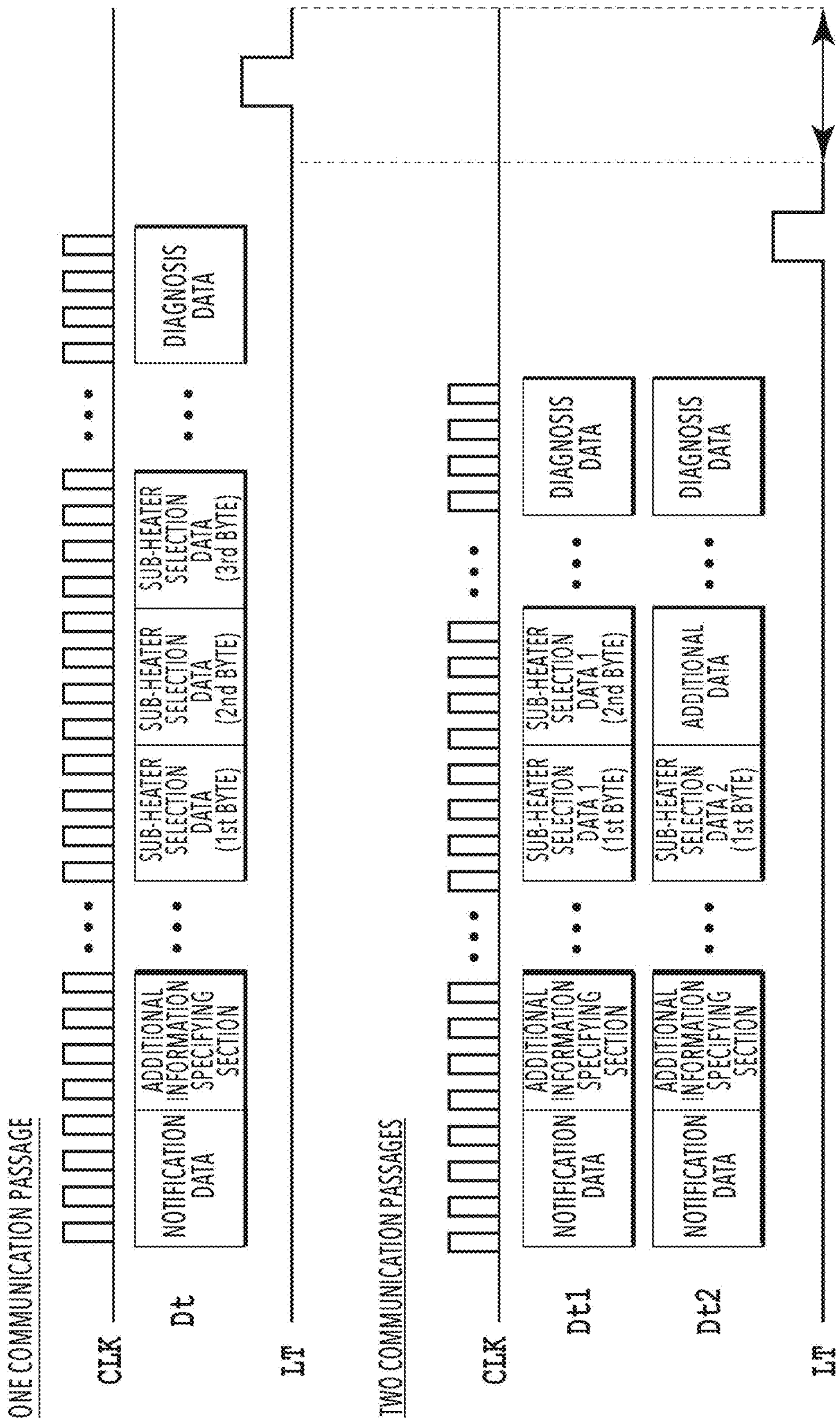

Note that although the number of pieces of sub-heater selection data should be made equal for Dt1 and Dt2 in principle as shown in FIG. 17A, the number of pieces of the sub-heater selection data may be made different between Dt1 and Dt2 as shown in FIG. 17B. In the present example, since the printing element board 101 includes the sub-heaters of 20 systems, it is possible to transmit all sub-heater selection data by securing three bytes in total for Dt1 and Dt2. However, in order to achieve the effects of the present embodiment, it is necessary to make the number of pieces of data (the number of bits) in total equal between Dt1 and Dt2, and it is thus necessary to insert additional data as shown in FIG. 17B.

Although the present embodiment has been described, limiting the number of heaters and the number of sub-heaters, the number of heaters and the number of sub-heaters are not limited to the above-mentioned numbers.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure makes it possible to provide a configuration of a printing element board that is capable of reducing a wire resistance, improving a layout, and achieving an increase in the frequency as compared with the conventional configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-097566, filed Jun. 14, 2023, which is hereby incorporated by reference wherein in its entirety.

What is claimed is:

1. A printing element board comprising:

a plurality of printing elements configured to eject a liquid, the plurality of printing elements being arrayed in a first direction to form a printing element array;

a heat generating element configured to heat the liquid;

a driver configured to drive the heat generating element;

a data processing circuit configured to generate a control signal for the driver, the data processing circuit being distinct from the driver; and a plurality of PADs configured such that a signal to be sent to the data processing circuit is inputted to the plurality of PADs from outside, the plurality of PADs being arrayed in the first direction to form a PAD array, wherein the data processing circuit is provided in at least two or more systems between the printing element array and the PAD array in a second direction orthogonal to the first direction, and wherein each of the at least two or more systems of the data processing circuit is configured to send the control signal to a corresponding driver.

2. The printing element board according to claim 1, further comprising:

a plurality of supply ports configured to be supplied with the liquid directed to the printing element, the plurality of supply ports being arrayed in the first direction to form a supply port array.

3. The printing element board according to claim 2, wherein the driver is disposed in a region on an opposite side from the printing element array with respect to the supply port array in the second direction.

4. The printing element board according to claim 1, wherein two of the supply port arrays are provided for each one of the printing element array, and the two supply port arrays are provided respectively at different positions with the printing element array interposed between the two supply port arrays in the second direction.

5. The printing element board according to claim 4, wherein the heat generating element is provided between the printing element array and the supply port array in the second direction.

6. The printing element board according to claim 1, wherein a plurality of the heat generating elements are provided, a heating area is determined for each of the plurality of heat generating elements, and a plurality of the heating areas have substantially the same layout.

7. The printing element board according to claim 6, wherein the numbers of the printing elements contained respectively in the plurality of heating areas are equal.

8. The printing element board according to claim 7, wherein the driver is provided in a one-to-one correspondence with each of the plurality of heating area.

9. The printing element board according to claim 8, wherein a plurality of the drivers are provided, and a wiring between each of the plurality of drivers and the data processing circuit is an individual wiring.

10. The printing element board according to claim 1, wherein the heat generating element is formed of polysilicon.

11. The printing element board according to claim 10, wherein the heat generating element includes a heat generating unit formed of polysilicon, a bypass unit formed of aluminum, and a plug connecting the heat generating unit and the bypass unit.

12. The printing element board according to claim 11, wherein the plug is formed of tungsten.

13. The printing element board according to claim 1, wherein the data processing circuit includes a first data processing circuit and a second data processing circuit.

14. The printing element board according to claim 13, further comprising:

a first data analysis unit configured to analyze data inputted from a first PAD which is one of the plurality of PADs and send data to the first data processing circuit based on the analysis; and a second data analysis unit configured to analyze data inputted from a second PAD which is different from the first PAD and send data to the second data processing circuit based on the analysis.

15. The printing element board according to claim 14, further comprising:

a third PAD which is one of the plurality of PADs, the third PAD being configured such that a reset signal is inputted to the third PAD, wherein in a case where the reset signal is inputted to the first data processing circuit, a value held in a shift register of the first data processing circuit is reset, and in a case where the reset signal is inputted to the second data processing circuit, a value held in a shift register of the second data processing circuit is reset.

16. The printing element board according to claim 1, comprising:

a plurality of the printing element arrays, wherein the plurality of printing element arrays are provided respectively at different positions in the second direction.

17. A printing element board comprising:

a printing element configured to eject a liquid;

a heat generating element configured to heat the liquid;

a driver configured to drive the heat generating element;

a data processing circuit configured to generate a control signal for the driver, the data processing circuit being distinct from the driver; and an analysis unit configured to determine, based on an additional information specifying section included in print data transferred at a constant cycle, whether a first signal for driving the heat generating element is transferred to the heat generating element and cause a shift register of the data processing circuit to store the first signal based on a result of the determination, wherein a signal for driving the printing element is transferred at the constant cycle, the analysis unit determines whether the first signal is transferred, at the constant cycle, and the first signal and a second signal for driving the printing element are transferred by using at least two or more communication passages.

18. The printing element board according to claim 17, further comprising:

a PAD configured such that a signal is inputted to the PAD from outside.

19. The printing element board according to claim 18, wherein the number of the analysis units is equal to the number of communication passages, and the number of the PADs is equal to or larger than the number of communication passages.

20. The printing element board according to claim 19, wherein the data processing circuit includes a first data processing circuit and a second data processing circuit, the analysis unit includes a first analysis unit connected to the first data processing circuit and a second analysis unit connected to the second data processing circuit, and a plurality of the PADs include a first PAD connected to the first analysis unit, a second PAD connected to the second analysis unit, and a third PAD configured such that a reset signal is inputted to the third PAD.

* * * * *